3,406,171
N - TERTIARYAMINO - N' - [ALKYL, ALLYL OR TERTIARY AMINO]DITHIOCARBAMOYL MONOSULPHIDES
Ranajit Ghosh, Bracknell, England, assignor to Imperial Chemical Industries Limited, London, England, a corporation of Great Britain
No Drawing. Filed May 14, 1965, Ser. No. 455,957
Claims priority, application Great Britain, May 19, 1964, 20,582/64
10 Claims. (Cl. 260—247.1)

ABSTRACT OF THE DISCLOSURE

N-tertiary amino-N'-[alkyl, allyl or tertiary amino]dithiocarbamoyl monosulphides useful as pesticides. The compounds are prepared by reacting dithiocarbazinic acid or a salt thereof with an isothiocyanate, or by bringing into reaction with a dithiocarbazinic acid or salt thereof chloroformic acid ester, or phosgene.

---

This invention relates to new fungicidal compounds and more particularly to new thiocarbamoyl monosulphides and to fungicidal compositions containing the same.

According to the present invention we provide new di(thiocarbamoyl)monosulphides wherein a nitrogen atom of at least one of the thiocarbamoyl groups bears a substituted amino group.

Compounds which are preferred have the formula:

$$\text{I} \quad \underset{R_1}{\overset{R_2}{\diagdown}}N-\underset{R_5}{N}-\overset{S}{\overset{\|}{C}}-S-\overset{S}{\overset{\|}{C}}-\underset{R_4}{N}-R_3$$

wherein $R_1$ and $R_2$ are alkyl, alkenyl, aryl or heterocyclic groups, or groups which are united and together with their adjacent nitrogen atom form a heterocyclic group; $R_3$ is an alkyl or alkenyl group or a group having the structure:

$$-N\diagdown\underset{R_7}{\overset{R_6}{}}$$

wherein $R_6$ and $R_7$ are alkyl, alkenyl, aryl or heterocyclic groups, or groups which are united and together with their adjacent nitrogen atom form heterocyclic groups; and $R_4$ and $R_5$ are hydrogen atoms or alkyl or alkenyl groups. The groups present in the new compounds may be the same or different. When alkyl or alkenyl groups are present they may have from 1 to 20 carbon atoms and preferably from 1 to 6. Other groups which may be present include aryl groups, for example a phenyl group, and heterocyclic groups, for example morpholino, piperidino and pyrrolidino groups. These heterocyclic groups also constitute examples of those that can be formed as a result of the uniting of groups $R_1$ and $R_2$, and $R_6$ and $R_7$. Any of the groups may be substituted or unsubstituted. When substituents are present they may be alkyl, alkoxy or alkyl mercapto groups.

The following compounds are included within the scope of the invention:

| Structure | Name |
|---|---|
| $\underset{CH_3}{\overset{CH_3}{\diagdown}}N-\underset{H}{N}-\overset{S}{\overset{\|}{C}}-S-\overset{S}{\overset{\|}{C}}-\underset{H}{N}-CH_3$ | N-dimethylamino-N'-methyl di(thiocarbamoyl)-monosulphide. |
| $\underset{C_2H_5}{\overset{C_2H_5}{\diagdown}}N-\underset{H}{N}-\overset{S}{\overset{\|}{C}}-S-\overset{S}{\overset{\|}{C}}-\underset{H}{N}-C_2H_5$ | N-diethylamino-N'-ethyl di(thiocarbamoyl)-monosulphide. |
| $\underset{CH_3}{\overset{CH_3}{\diagdown}}N-\underset{H}{N}-\overset{S}{\overset{\|}{C}}-S-\overset{S}{\overset{\|}{C}}-\underset{H}{N}-CH_2 \cdot CH=CH_2$ | N-dimethylamino-N'-allyl di(thiocarbamoyl)-monosulphide. |
| $\underset{C_2H_5}{\overset{CH_3}{\diagdown}}N-\underset{H}{N}-\overset{S}{\overset{\|}{C}}-S-\overset{S}{\overset{\|}{C}}-\underset{H}{N}-CH_3$ | N-ethyl(methyl)amino-N'-methyl di(thiocarbamoyl) monosulphide. |
| cyclohexyl$-\underset{H}{N}(CH_3)-\underset{H}{N}-\overset{S}{\overset{\|}{C}}-S-\overset{S}{\overset{\|}{C}}-\underset{H}{N}-CH_3$ | N-methyl (cyclohexyl) amino-N'-methyl di-(thiocarbamoyl) monosulphide. |
| $\underset{CH_3}{\overset{CH_3}{\diagdown}}N-\underset{CH_3}{N}-\overset{S}{\overset{\|}{C}}-S-\overset{S}{\overset{\|}{C}}-\underset{H}{N}-CH_3$ | N-dimethylamino-N,N'-dimethyl di(thiocarbamoyl)monosulphide. |
| morpholino$-\underset{H}{N}-\overset{S}{\overset{\|}{C}}\diagdown_S\diagup\overset{S}{\overset{\|}{C}}-\underset{H}{N}-CH_3$ | N-methyl-N'-morpholin-4-yl di(thiocarbamoyl) monosulphide. |
| piperidino$-\underset{H}{N}-\overset{S}{\overset{\|}{C}}\diagdown_S\diagup\overset{S}{\overset{\|}{C}}-\underset{H}{H}-C_2H_5$ | N-piperidino-N'-ethyl di(thiocarbamoyl) monosulphide. |
| $\underset{CH_3}{\overset{CH_3}{\diagdown}}N-\underset{H}{N}-\overset{S}{\overset{\|}{C}}\diagdown_S\diagup\overset{S}{\overset{\|}{C}}-\underset{H}{N}-N\underset{CH_3}{\overset{CH_3}{\diagup}}$ | N,N'-bisdimethylamino di(thiocarbamoyl) monosulphide. |

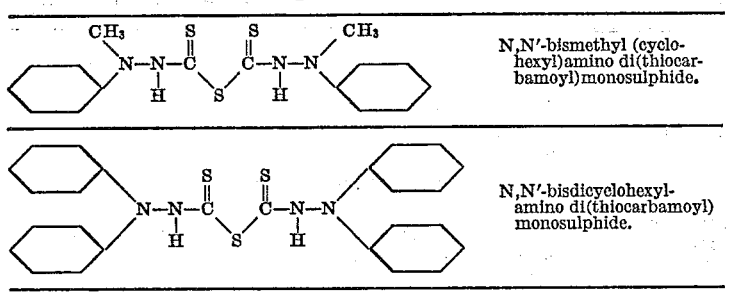

| | |
|---|---|
| | N,N'-bismethyl (cyclohexyl)amino di(thiocarbamoyl)monosulphide. |
| | N,N'-bisdicyclohexyl-amino di(thiocarbamoyl) monosulphide. |

The compounds are obtainable by a number of different processes the suitability of any one of which depends upon the particular compound which is to be made. One of the processes which is generally very convenient for making compounds wherein $R_3$ in Formula I is an alkyl or an alkenyl group and $R_4$ is hydrogen comprises bringing a substituted dithiocarbazinic acid into reaction with an organic isothiocyanate. The process is generally carried out in the presence of a base in which case the dithiocarbazinic acid is present in the form of a salt which is derived preferably from ammonia, an organic base or an alkali metal or an alkaline earth metal. The reaction may be illustrated by the following equation in which groups $R_1$, $R_2$, $R_3$ and $R_5$ have the meanings previously ascribed to them and M is a hydrogen atom or salt-forming atoms or group of atoms.

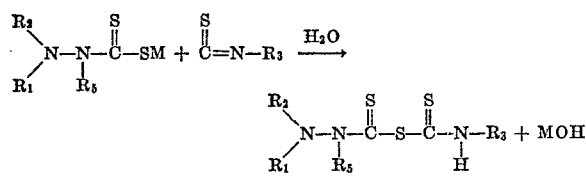

Dithiocarbazinic acids and their salts are generally unstable substances. The latter however are somewhat more stable and are preferably prepared immediately before use by bringing a hydrazine compound into reaction with carbon disulphide in the presence of a base and thereafter treating the resulting dithiocarbazinate with the isothiocyanate. The first stage of the process can be illustrated as follows:

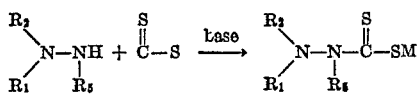

wherein M is a salt forming atom or group of atoms.

Both the above processes are conveniently carried out in aqueous medium and occur readily at ambient or slightly elevated temperatures, for example at temperatures of between 20–75° C. and preferably below 50° C. The proportions in which the reactants can be used may vary, however the reactants are preferably used in stoichiometric proportions since by this means the tendency for yields of the required product to be lowered by side reactions is reduced and isolation of the product from the reaction mixtures is facilitated. Notwithstanding the above however the base in the presence of which the dithiocarbazinic acid is brought into reaction with the isothiocyanate may itself be the same hydrazine compound which is used to form the acid. When therefore the latter is required to be used in the form of its hydrazine salt two molecular proportions of the hydrazine compound are used for each molecular proportion of carbon disulphide.

The compounds of the invention are also by a process which comprises bringing a thiocarbamoyl halide into reaction with a substituted dithiocarbamic acid in the presence of a base.

Bis(di - substituted - amino)-di-(thiocarbamoyl)monosulphides wherein $R_3$, of Formula I above, has the structure:

are obtainable readily by bringing a substituted dithiocarbazinic acid into reaction with a chloroformic ester, for example ethyl chloroformate, or phosgene. The dithiocarbazinic acid is, as in the previous processes, employed preferably in the form of a salt which has been prepared immediately before use. The process is carried out conveniently in an aqueous medium and generally under cool conditions, that is at temperatures in the range of $-5$ to $+5$ C., however higher or lower temperatures may also be used. Both the mono and bis(di-substituted-amino) compounds are generally solids which are insoluble in water. When therefore they are prepared in an aqueous medium they are precipitated as they are formed and can be isolated readily by filtration.

The present compounds are effective against a wide variety of fungal diseases which include those which may affect the foliage of plants, or their seeds or are present in the soil and which may be transmitted to both the seeds and to plants grown from the seeds. The compounds may be used to control early blight in tomato (*Alternaria solani*), chocolate spot on broad beans (*Botrytis fabae*), late blight on tomatoes (*Phytophthora infestans*), blast on rice (*Piricularia oryzae*), leaf smut on wheat (*Puccinia triticina*), wilt on tomato (*Fusarium oxysporum* var. *lycopersicum*), scab on apple (*Venturia inaequalis*), foot-rot on wheat (*Fusarium culmorum*), foot-rot on peas (*Pythium ultimum*), sore shin on cotton (*Rhizoctonia solani*), black arm on cotton (*Xanthomonas malvacearum*).

The compounds are preferably converted into formulations to assist in their application. For example they may be used in the form of a powdery composition in which a minor amount of the compound is in admixture with a major amount of a solid diluent.

Suitable diluents include powdered kaolin, fuller's earth, gypsum, chalk, Hewitt's earth and China clay. More conveniently the compounds may be used as a liquid preparation which is generally an aqueous dispersion or emulsion containing a surface active agent, for example a wetting or dispersing agent. Suitable agents include condensation products of ethylene oxide with various substances, for example with alkylated phenols such as octyl phenol and nonyl phenol; sorbitan monolaurate, oleyl alcohol, cetyl alcohol and propylene oxide polymer. Other agents which are also suitable include calcium dodecylbenzene sulphonate, calcium lignosulphonate, sodium lignosulphonate, and ammonium lignosulphonate. A convenient way of making a liquid preparation comprises dissolving the compound in an organic solvent, for example, dimethyl formamide, and then agitating the solution with water containing the surface active agent.

The amount of the compounds which may be used in the formulations which are ready for application can vary widely depending upon the compound which is to be used and fungus disease which is to be controlled. In general, however, formulations containing from 1.0 to 0.01% by weight give good results although larger or smaller quantities may sometimes be desirable.

The compounds are conveniently made available by a supplier in the form of a concentrate which is a composition containing a high proportion of the compound and which therefore is generally required to be diluted usually with water before application. Concentrates are also formulated to withstand storage for prolonged periods and after a period of storage to be capable of dilution easily to form liquid preparations which remain homogeneous for a sufficient time to enable them to be applied by conventional spray equipment. The concentrates may contain from 10 to 83% by weight of the compound although for practical purposes from 25 to 60% by weight is usually preferred. An especially satisfactory form of concentrate comprises a dispensable powder comprising a mixture of the compound and a surface active agent.

This invention is illustrated by the following examples.

Example 1

This example illustrates the preparation of N-dimethylamino-N'-methyl di(thiocarbamoyl) monosulphide having the formula:

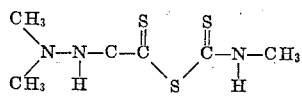

Carbon disulphide (6.5 cc.) was added gradually to a solution of 1,1-dimethyl-hydrazine (12.0 g.) in water (5 cc.) with occasional cooling so that the temperature of the mixture did not rise above 30° C. After addition, the mixture was agitated further until no carbon disulphide remained unreacted. The mixture was then diluted with water to a volume of ca. 50 cc. and then treated with methylisothiocyanate (7.3 g.), and the resulting mixture stirred for 4 hours.

During the process N-dimethylamino-N'-methyl di(thiocarbamoyl) monosulphide was precipitated. This was removed by filtration and washed and dried. The product was found to melt with decomposition at 115° C.

Example 2

This example illustrates the preparation of N-dimethylamino N,N'-dimethyl-di(thiocarbamoyl) monosulphide having the formula:

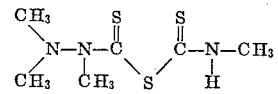

Carbon disulphide (6.5 cc.) was added dropwise with stirring to a solution of trimethyl hydrazine (14.8 g.) in water (5.0 cc.). The mixture was stirred for 15 minutes after the addition was complete, until the pH was 7.5. Methylisothiocyanate (7.3 g.) was then added dropwise to the mixture at 30° C. with vigorous stirring, followed by stirring at room temperature for 1 hour. The solid product was filtered, washed with a little cold water, and finally recrystallised from alcohol. N-dimethylamino-N,N'-dimethyl di(thiocarbamoyl) monosulphide was obtained as a solid having a melting point of 104–105° C.

Example 3

This example illustrates the preparation of N-diethylamino-N'-ethyl di(thiocarbamoyl) monosulphide having the formula:

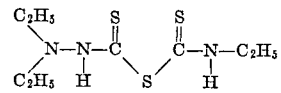

1,1-diethyl hydrazine (8.8 g.) was added slowly into a stirred mixture of carbon disulphide (6.5 cc.) and a solution of sodium hydroxide (4.0 g.) in water (15 cc.) at 25 to 30° C. After the addition the mixture was stirred for 4 hours at 40 to 45° C. and then cooled to 20° C. and treated gradually with ethylisothiocyanate (11.6 g.). The resulting mixture was stirred for 3½ hours at 20° C. N-diethylamino-N'-ethyl di(thiocarbamoyl) monosulphide was precipitated from the aqueous liquid and was removed by filtration. The product was found to possess a melting point of 82–83° C.

Example 4

This example illustrates the preparation of N-methyl-N'-morpholin-4-yl di(thiocarbamoyl) monosulphide having the formula:

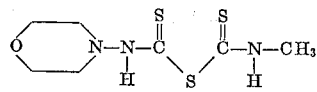

N-amino-morpholine hydrochloride (27.8 g.) was gradually added to a solution of sodium hydroxide (8.0 g.) in water (30 cc.) and the precipitated sodium chloride was removed by filtration. The filtrate was then treated dropwise with carbon disulphide (6.5 cc.), the temperature of the resulting mixture being maintained between 24 and 30° C. After all the carbon disulphide had been added, the mixture was stirred at 30 to 35° C. for 30 minutes. Methyl isothiocyanate (7.3 g.) was then added to the mixture at 28° C. and the whole stirred for 1 hour. The precipitated solid was then filtered, washed with cold water and then dried in a vacuum desiccator. N-methyl-N'-morpholin-4-yl di(thiocarbamoyl) sulphide was obtained as a solid having a melting point of 82 to 84° C.

Example 5

This example illustrates the preparation of N-dimethylamino-N'-allyl di(thiocarbamoyl) monosulphide having the formula:

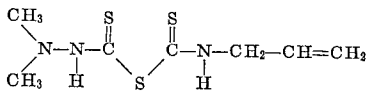

The procedure of Example 1 was followed using 1,1-dimethyl hydrazine (12 cc.), carbon disulphide (6.2 cc.) and allylisothiocyanate (9.7 cc.). The product on recrystallisation from ethanol gave N-dimethylamino-N'-allyl di(thiocarbamoyl) monosulphide melting point 94 to 95° C. with decomposition.

Example 6

This example illustrates the preparation of N,N'-bisdimethylamino di(thiocarbamoyl) monosulphide having the formula:

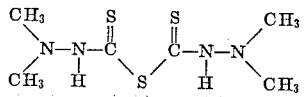

1,1-dimethyl hydrazine (12 cc.) was added dropwise slowly to a stirred mixture of carbon disulphide (12.5 cc.) and a solution of sodium hydroxide (8.0 g.) in water (15 cc.) at 15 to 20° C. After addition, this mixture was stirred and its temperature was allowed to rise and was maintained at 35 to 45° C. for 3 hours. The mixture was cooled to −50° C., treated gradually with stirring with ethyl chloroformate (9.8 cc.) and then stirred for a further period of 30 minutes and filtered. The solid product on recrystallisation from methanol gave N,N-bisdimethylamino di(thiocarbamoyl) monosulphide, which slowly decomposed above 145° C. and melted indeterminately between 145 and 155° C.

Example 7

This example illustrates the preparation of N,N'-bisdiethylamino di(thiocarbamoyl) monosulphide having the formula:

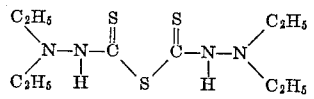

The procedure of Example 6 was followed using 1,1-diethyl hydrazine (8.8 g.), carbon disulphide (6.2 cc.), sodium hydroxide (4.1 g.) in water (9 cc.), and ethyl chloroformate (4.8 g.). The resulting oily product was induced to crystallise by addition of a few drops of ethanol. After filtration the solid was recrystallised from ethanol to give N,N'-bis-diethylamino di(thiocarbamoyl) monosulphide, melting point 129° C. with decomposition.

Example 8

This example illustrates the preparation of N,N'-bis-di-n-propylamino di(thiocarbamoyl) sulphide having the formula:

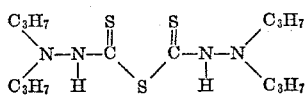

The procedure of Example 6 was followed using 1,1-di-n-propyl hydrazine (14.0 g.) carbon disulphide (7.0 cc.), sodium hydroxide (4.8 g.) dissolved in water (10 cc.) and ethyl chloroformate (5.9 cc.). The final reaction mixture was stirred at 0° C. for 3 hours N,N'-bis-di-n-propyl-amino di(thiocarbamoyl) monosulphide was precipitated from the aqueous liquid and was removed by filtration. The product was found to possess a melting point of 110° C.

Example 9

This example illustrates a dusting powder containing N,N'-bis-dimethylamino di(thiocarbamoyl) monosulphide as the active ingredient.

|  | Percent wt. |
|---|---|
| Active ingredient | 2 |
| Talc | 98 |

Example 10

This example illustrates a wettable powder containing N,N'-bisdiethylamino di(thiocarbamoyl) monosulphide as the active ingredient.

|  | Percent wt. |
|---|---|
| Active ingredient | 50 |
| Calcium lignosulphonate | 10 |
| China clay | 40 |

Example 11

This example illustrates an emulsion concentrate containing N-dimethylamino-N'-allyl di(thiocarbamoyl) monosulphide as the active ingredient.

|  | Percent wt. |
|---|---|
| Active ingredient | 10 |
| Dimethyl formamide | 70 |
| Wetting agent comprising a condensation product of nonyl phenol and ethylene oxide | 20 |

Example 12

According to this example dispersions of a number of compounds were prepared by dispersing the compounds in water containing 0.1% by weight of a wetting agent comprising a mixture of a condensation product of ethylene oxide with a mixture of oleyl and cetyl alcohol. These dispersions were then tested against chocolate spot on beans (*Botrytis fabae*) and late blight on tomato (*Phytophthora infestans*).

In these tests young bean and tomato plants were sprayed with the dispersions and were then allowed to dry overnight. The plants were then inoculated with spores of the diseases and the number of lesions caused by the diseases on the treated plants was assessed visually after two days with respect to the tests with *Botrytis fabae* and after four days with respect to the tests with *Phytophthora infestans*. The amount of disease which formed on the treated plants is expressed as a percentage of the number of lesions which formed on untreated plants used for control purposes.

The following results were obtained:

| Compound of example | Percent wt. of compound | Percent disease *Botrytis fabae* | Percent disease *Phytophthora infestans* |
|---|---|---|---|
| 6 | 0.2 | 0.2 | 0.1 |
|  | 0.04 | 0.2 | 0.4 |
| 1 | 0.2 | 0.0 | 0.0 |
|  | 0.04 | 0.0 | 0.7 |
| 5 | 0.2 | 0.0 | 3.0 |
|  | 0.04 | 0.0 | 3.7 |

A test with the compound of Example 5 was carried out on rice plants inoculated with rice blast (*Piricularia oryzae*) using a dispersion containing 0.05% by weight of the compound. After 7 days the treated plants developed 13.1% of disease compared with the amount of disease which developed on untreated plants used for control purposes.

What I claim is:
1. N-dimethylamino - N' - methyl-di(thiocarbamoyl) monosulphide.
2. N-dimethylamino - N,N' - dimethyl-di(thiocarbamoyl) monosulphide.
3. N - diethylamino - N' - ethyl - di(thiocarbamoyl) monosulphide.
4. N-methyl-N'-morpholin - 4 - yl - di(thiocarbamoyl) monosulphide.
5. N-dimethylamino - N' - allyl - di(thiocarbamoyl) monosulphide.
6. A di(thiocarbamoyl) monosulphide according to claim 10 wherein $R_1$, $R_2$ and $R_3$ are alkyl of one to six carbon atoms, and $R_4$ and $R_5$ are both hydrogen.
7. A di(thiocarbamoyl) monosulphide according to claim 10 wherein $R_1$ and $R_2$ are alkyl of one to six carbon atoms, $R_3$ is allyl and $R_4$ and $R_5$ are both hydrogen.
8. A di(thiocarbamoyl) monosulphide according to claim 10 wherein $R_1$ and $R_2$ together with the adjacent nitrogen atom constitute the atoms necessary to complete a ring selected from morpholino, piperidino and pyrrolidino, $R_3$ is alkyl of one to six carbon atoms and $R_4$ and $R_5$ are both hydrogen.
9. A di(thiocarbamoyl) monosulphide according to claim 10 wherein $R_1$ and $R_2$ are alkyl of one to six carbon atoms, $R_3$ is

wherein $R_6$ and $R_7$ are both alkyl of one to six carbon atoms, and $R_4$ and $R_5$ are both hydrogen.
10. A di(thiocarbamoyl) monosulphide having the formula:

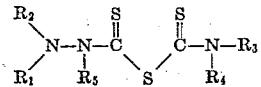

wherein $R_1$ and $R_2$ are alkyl of one to six carbon atoms, cyclohexyl or together with the nitrogen atom to which they are attached form morpholino, piperidino or pyrrolidino, $R_3$ is alkyl of one to six carbon atoms, allyl or

wherein $R_6$ and $R_7$ are alkyl of one to six carbon atoms or cyclohexyl, $R_4$ and $R_5$ are hydrogen or alkyl of one to six carbon atoms.

(References on following page)

References Cited

UNITED STATES PATENTS

| | | | |
|---|---|---|---|
| 2,048,043 | 7/1936 | Williams et al. | 260—567 |
| 3,133,966 | 5/1964 | Trutna | 260—567 |
| 2,695,291 | 11/1954 | Niederl et al. | 260—247.1 |
| 2,840,556 | 6/1958 | Kinstler | 260—247.1 |
| 2,957,001 | 10/1960 | Smith | 260—293 |
| 3,007,843 | 11/1961 | Luckenbaught | 167—22 |
| 3,096,236 | 7/1963 | D'Anico | 167—22 |

NICHOLAS S. RIZZO, *Primary Examiner.*

JOSE TOVAR, *Assistant Examiner.*